(No Model.)
R. C. BORCHERS.
FRICTION COUPLING.
No. 410,232. Patented Sept. 3, 1889.
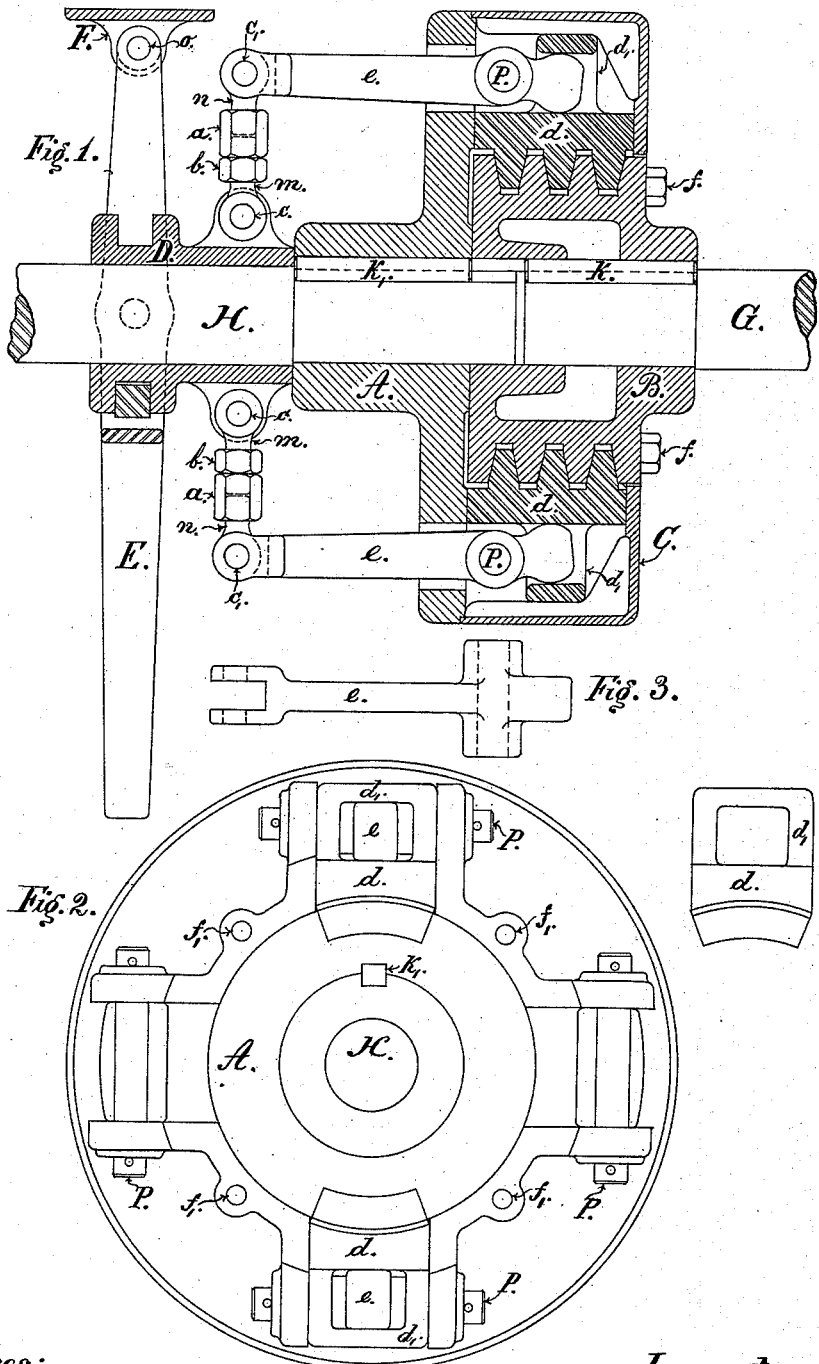
Witnesses:
A. E. Albrecht
A. E. Schmidt
Inventor:
Richard C. Borchers

UNITED STATES PATENT OFFICE.

RICHARD C. BORCHERS, OF PHILADELPHIA, PENNSYLVANIA.

FRICTION-COUPLING.

SPECIFICATION forming part of Letters Patent No. 410,232, dated September 3, 1889.

Application filed January 8, 1889. Serial No. 295,766. (No model.)

*To all whom it may concern:*

Be it known that I, RICHARD C. BORCHERS, of the city of Philadelphia and State of Pennsylvania, have invented a new and useful Friction-Coupling, of which the following is a specification.

My invention relates to that kind of coupling whereby two shafts while revolving might be coupled or uncoupled at will, so that one of the shafts can be stopped while the other one keeps revolving.

In the accompanying drawings, which illustrate my new friction-coupling, Figure 1 is a vertical section of the entire coupling. Fig. 2 is a view of the inner face of one-half of the coupling with the cover and some of the inner parts removed. Figs. 3 and 4 show views of some of the removed parts.

Similar letters refer to similar parts throughout the several views.

The shaft G is supposed to be the driver and shaft H the driven one. On the reduced end of the shaft G is fastened with the key $k$ a large hub B, which is cored out to lighten it, and which has several V-shaped grooves turned in its periphery, into which opposite to each other two or more or less pairs of dogs $d$ are fitted, which have cast on their back a yoke $d'$, into which the ends of the levers $e$ fit, by which these dogs $d$ are either pressed tight into the V-shaped grooves of the hub B or are withdrawn therefrom.

A is a hubbed plate fastened with the key $k$ on the reduced end of the shaft H, but so that part of the reduced end of the shaft H will project and enter the hub B in order to keep the two shafts in line when they are uncoupled. This plate A has four ribs cast on the inner face, which form four pockets opposite to each other, into which the dogs $d$ are fitted and in which the levers $e$ are fastened by the pins P. These ribs have also four holes $f'$, which are tapped out for the screws $f$, by which the cover C is fastened.

D is a sliding sleeve, which is moved toward the plate A or away from it by the lever E, which is fastened at $o$ on the fulcrum-stand F. The sleeve D has opposite to each other four pairs of lugs cast on it, between which the toggle-links $m$ are held by the pins $c$. These toggle-links $m$ have right-hand threads cut on their ends and enter half-way into the nuts $a$, which have left-hand threads cut into their other half to receive the ends of the toggle-links $n$, which are fastened in the ends of the levers $e$ by the pins $c$. The jam-nuts $b$ are to lock the nuts $a$ after they have been adjusted.

After thus describing the details of my coupling, I will now explain how it operates. If the sleeve D is pushed with the lever E against the hubbed plate A, the toggle-links $m\ n$ will force the long ends of the levers $e$ away from the shaft H, and turning around the pins P the short ends of these levers $e$ will push the dogs $d$ tight into the V-shaped grooves of the hub B, thus causing the hubbed plate A to revolve with the hub B; and if the sliding sleeve D is pushed in opposite direction the dogs $d$ will be pulled out of the grooves of the hub B, and the hubbed plate A will stand still, while the hub B will keep on revolving.

This coupling might also be used in connection with a pulley or any other revolving piece of machinery by fastening the plate A on the shaft and the hub B on the pulley or other piece of machinery which is loose on the shaft.

I claim as my invention and desire to secure by Letters Patent—

The friction-coupling consisting of the hub B, adapted to be secured to shaft G, said hub being provided with annular V-shaped grooves upon its periphery, the hubbed plate A, adapted to be secured to shaft H, the levers $e$, fulcrumed in said plate A, the wedges $d$, provided with V-shaped projections and with yokes $d'$, the adjustable toggle-links $m\ n$, and the sleeve D, all arranged to operate substantially as set forth.

RICHARD C. BORCHERS.

Witnesses:
   A. E. SCHMIDT,
   A. E. ALBRECHT.